United States Patent [19]

Hölle et al.

[11] Patent Number: 5,142,008

[45] Date of Patent: Aug. 25, 1992

[54] METHOD OF PRODUCING SUSPENSION POLYMERS AND IMPROVED SUSPENSION POLYMERS

[75] Inventors: Hans-Joachim Hölle, Rodenbach; Peter Reinhard, Kleinostheim, both of Fed. Rep. of Germany

[73] Assignee: Degussa AG, Fed. Rep. of Germany

[21] Appl. No.: 737,719

[22] Filed: Jul. 30, 1991

[30] Foreign Application Priority Data

Aug. 1, 1990 [DE] Fed. Rep. of Germany ....... 4024371

[51] Int. Cl.⁵ .................................................. C08F 4/30
[52] U.S. Cl. .................................... 526/193; 526/233; 526/318.4; 526/325
[58] Field of Search ................................. 526/193, 233

[56] References Cited

U.S. PATENT DOCUMENTS

| | | | |
|---|---|---|---|
| 3,026,308 | 3/1962 | Kearney | 526/193 |
| 3,663,482 | 5/1972 | Gammon | 526/193 |
| 4,269,959 | 5/1981 | Lawton . | |
| 4,677,173 | 6/1987 | Hölle et al. . | |

FOREIGN PATENT DOCUMENTS

| | | | |
|---|---|---|---|
| 0190433 | 12/1985 | European Pat. Off. . | |
| 1051500 | 10/1955 | Fed. Rep. of Germany | 526/193 |
| 3503584 | 6/1986 | Fed. Rep. of Germany | 526/193 |
| 3925981 | 11/1964 | Japan | 526/193 |
| 43-19017 | 8/1968 | Japan | 526/193 |
| 45-14797 | 5/1970 | Japan | 526/193 |
| 55-106201 | 6/1980 | Japan . | |
| 1243052 | 8/1971 | United Kingdom | 526/193 |

OTHER PUBLICATIONS

European Search Report.

*Primary Examiner*—Joseph L. Schofer
*Assistant Examiner*—N. Sarofim
*Attorney, Agent, or Firm*—Cushman, Darby & Cushman

[57] ABSTRACT

In the suspension polymerization of (meth)acrylic acid esters or of vinyl aromatics or of mixtures of such monomers, the formation of undesired, very fine "emulsion polymer", which reduces the yield, is reduced if the polymerization is carried out in the presence of polyvalent phosphonic acids or their alkali metal salts or ammonium salts or of alkali metal salts or ammonium salts of condensed inorganic phosphates, e.g. of Graham's salt.

7 Claims, No Drawings

METHOD OF PRODUCING SUSPENSION POLYMERS AND IMPROVED SUSPENSION POLYMERS

The present invention relates to a method of producing suspension polymers by polymerization of esters of acrylic acid or of methacrylic acid or of vinyl aromatic compounds or of monomer mixtures consisting primarily of such monomers and improved suspension polymers. The process is carried out in aqueous suspension and in the presence of a water-soluble, high-molecular organic dispersing agent.

BACKGROUND OF THE INVENTION

Dispersing agents for suspension polymerizations are known, e.g. polyvinyl alcohols and partially saponified polyvinyl acetates or cellulose ethers such as hydroxyethyl cellulose or sodium carboxymethyl cellulose. Especially suitable dispersing agents are homopolymers of acrylic acid or of methacrylic acid and particularly suitable are copolymers, at least 50% by weight of which is derived from these acids. These polymers can be used in the form of free acids or as alkaline-metal salts or ammonium salts. They have the advantage that they can generally be readily removed by washing the polymer beads which are formed in the process.

However, this advantage is associated with a significant disadvantage, i.e., that undesirably large amounts of very fine emulsion polymer are produced when using these dispersing agents in addition to the desired suspension polymer (see *Makromoleculare Chemie* 78, p. 25, (1954)). This emulsion polymer remains during the workup of a polymerization batch, for the most part in the waste water, and consequently results in a corresponding yield loss. Since the emulsion polymer deviates generally from the desired suspension polymer in its molecular weight and, in the case of co-polymers, also in the monomer composition, recovery from the waste water for the purpose of improving the yield is generally not useful.

Japanese published, unexamined application 2302/83 suggests preventing the formation of emulsion polymer by the addition of water-soluble metal salts of polyvalent carboxylic acids in an amount of 100 to 20,000 ppm relative to the aqueous phase. However, an experimental test showed no, or at the most an unsatisfactory, effect in many instances.

SUMMARY OF THE INVENTION

In the method of the invention, the polymerization is carried out in the presence of at least one polyvalent phosphonic acid which contains 2 to 10 phosphonic acid groups in the molecule in the form of the free acid or its alkaline-metal salt or its ammonium salt or in the form of an alkali metal salt or ammonium salt of a condensed inorganic phosphate with the formula $M^1_{n+2}P_nO_{3n+1}$ in which $M^1$ signifies an alkali metal ion or an ammonium ion and "n" signifies a number from 3 to 100.

The such obtained polymer has an injection molding decomposition temperature of at least 300° C., normally of at least 320° C., when at least 80 wt.-% of the polymer is methyl methacrylate. Further, the polymer has an improved yellowness index of at least the factor 0.9, normally of at least the factor 0.85 compared with a reference polymer produced without the phosphonic or phosphate compounds.

The additive is advantageously used in an amount of 2 to 5000 ppm, preferably from 5 to 500 ppm and especially from 10 to 100 ppm, relative in each instance to the water present in the polymerization system.

Typical examples for the polyvalent phosphonic acids to be used in accordance with the invention are the following compounds, which are obtainable e.g. as commercial products from the firm Protex (Levallois, France): 1-hydroxyethane-1,1-diphosphonic acid (HEDP), nitrilotrimethylene phosphonic acid (NTPO), ethylene diamine tetramethylene phosphonic acid (EDTPO), hexamethylene diamine tetramethylene phosphonic acid (HDTPO), diethylene triamine pentamethylene phosphonic acid (DTPPO).

Phosphates with n=10 to 50 and their Na- or K-salts are preferred. A typical example of an inorganic phosphate to be used in accordance with the invention is the commercially available, so-called Graham's salt with an average degree of condensation n of approximately 20.

The polyvalent phosphonic acids and their alkali metal salts or ammonium salts are preferred, since they exhibit a considerably lesser tendency to hydrolyze compared to the inorganic polyphosphates and they also effectively restrain the formation of emulsion polymer even in the presence of polyvalent cations such as $Mg^{2+}$ ions or $Al^{3+}$ ions. Salts of such polyvalent ions are frequently added to the polymerization system in order to improve the stability of the dispersion or to influence properties of the final product in a certain manner.

The additives to be used in accordance with the invention are customarily added to the aqueous phase. For convenience, they may be added to the dispersing agent, if the latter is stored in the form of an aqueous solution. However, they can also be added to the monomer phase, given sufficient monomer solubility. Although their addition is only required in a small amount, they nevertheless bring about a significant reduction of the amount of emulsion polymer. There is no adverse effect on the course of the polymerization or on the properties of the product. On the contrary, in many instances the stability of the dispersion is improved and there also is an improvement of the properties of the suspension polymers produced (e.g. color, thermal resistance). The fact that the additives generally do not exhibit any marked optimum concentration in their effectiveness but rather are active to the same degree over a relatively wide concentration range is especially advantageous for an industrial process.

The method of the invention is basically suitable for the polymerization of all monomers and monomer mixtures selected from the group consisting of acrylic or methacrylic acid esters and vinyl aromatics which are customarily polymerized in suspension. It is advantageous to select monomers which produce polymers having a glass transition temperature of at least 30° C., to avoid adhesion of the polymer beads.

Suitable monomers are in particular the esters of acrylic acid and methacrylic acid with monovalent alcohols, especially alcohols having 1 to 16 carbon atoms such as methacrylic acid methyl ester, methacrylic acid ethyl ester, methacrylic acid n-butyl ester, methacrylic acid isobutyl ester, methacrylic acid-2-ethyl hexyl ester, methacrylic acid lauryl ester, methacrylic acid stearyl ester, acrylic acid methyl ester, acrylic acid ethyl ester, acrylic acid n-butyl ester, acrylic acid tert. butyl ester, acrylic acid-2-ethyl hexyl ester or acrylic acid lauryl ester and vinyl aromatics such as styrene, vinyl toluene, p-tert. butyl styrene or α-methyl styrene.

Other suitable components of monomer mixtures are monomers which contain another functional group such as α,β, unsaturated mono- or dicarboxylic acids, e.g. acrylic acid, methacrylic acid or itaconic acid; esters of acrylic acid or methacrylic acid with bivalent alcohols, e.g. hydroxyethyl acrylate, hydroxyethyl methacrylate, hydroxypropyl acrylate or hydroxypropyl methacrylate; acrylamide or methacrylamide; dimethylaminoethyl acrylate or dimethylaminoethyl methacrylate. The amount of these monomers in the particular mixture should advantageously be limited to a maximum of approximately 10% by weight because of their water solubility. Other suitable components of monomer mixtures are e.g. glycidylacrylate or glycidylmethacrylate.

Preferred dispersing agents include: Homopolymers of acrylic acid or of methacrylic acid or co-polymers at least 50% by weight of which is derived from these acids and which contain in addition up to 50% by weight of structural elements derived from monomers copolymerizable with acrylic acid or methacrylic acid, especially methacrylic acid methyl ester.

These polymers are used with particular preference in the form of their alkali metal salts or ammonium salts. Especially suitable dispersing agents are those polymers which have, as alkali metal salts or ammonium salts in a 6% by weight aqueous solution, a dynamic viscosity between 200 and 10,000 mPa.S, measured at room temperature. These dispersing agents are advantageously used in an amount of 0.05 to 1% by weight, especially 0.1 to 0.4% by weight relative to the water present in the polymerization system. They are stored with advantage as 3 to 20% by weight aqueous solutions and are added in this form to the aqueous phase or to the polymerization batch.

In addition, polyvinyl alcohols and partially saponified polyvinyl acetates as well as cellulose ethers such as hydroxyethyl cellulose or sodium carboxymethyl cellulose can also be used as dispersing agents.

Aside from the dispersing agent, the aqueous polymerization phase can of course also contain further additives customarily used in suspension polymerizations, e.g. buffer salts such as disodium hydrogen phosphate or sodium dihydrogen phosphate or other salts or additives which provide special effects as regards the course of polymerization or product properties, e.g. magnesium sulfate.

Conventional free radical initiators, especially peroxides and azo compounds with decomposition temperatures below 120° C., may be used as polymerization initiators, and they are generally added to the monomer phase. It can be potentially advantageous to use a mixture of different initiators. The amount used is generally in the range between 0.1 and 5% by weight relative to the monomer phase. Suitable initiators are e.g. dioctanoyl peroxide, didecanoyl peroxide, dilauroyl peroxide, dibenzoyl peroxide, bis-(4-chlorobenzoyl)-peroxide, bis-(2,4-dichlorobenzoyl)-peroxide, bis-(2-methylbenzoyl)-peroxide, tert. butyl perpivalate, tert. butyl peroctoate, tert. butyl perbenzoate, azo bisisobutyric acid nitrile or azo bis-(2,4-dimethyl)-valeronitrile.

Up to 8% by weight of one or more known chain transfer agents can also be added in a customary manner to the monomer phase in order to adjust the molecular weight of the polymer formed. The following are mentioned by way of example: Mercaptans (thiols) such as n-butyl mercaptan, n-octyl mercaptan, n-dodecyl mercaptan or tert. dodecyl mercaptan; thioglycolic acid esters such as thioglycolic acid isooctyl ester or thioglycolic acid lauryl ester; thioglycolic acid; aliphatic chloro compounds; enol ether or dimeric α-methyl styrene.

In addition to the initiators and chain transfer agents, the monomer phase can also contain other customarily used additives, e.g. lubricants (stearic acid, cetyl alcohol) or stabilizers (UV stabilizers).

If cross-linked polymers are to be produced, the monomer phase can also contain up to approximately 10% by weight polyfunctional monomers, e.g. ethylene glycol di(meth)acrylate, butane diol di(meth) acrylate or divinyl benzene.

The method of the invention can be carried out in principle in the manner customary for suspension polymerization. In a discontinuous embodiment, e.g. the aqueous phase, which already contains the dispersing agent, the additive or additives to be used in accordance with the invention and, optionally, other conventional additives, is placed in a suitable polymerization vessel and the monomer phase, which as a rule already contains the monomer-soluble additives such as initiators, chain transfer agents or lubricants in dissolved form, is added with agitation. The atmospheric oxygen contained in the polymerization system is advantageously removed by means of evacuation and flushing with nitrogen. The polymerization is started by heating the batch.

The monomer/water ratio is between 1:4 and 1:0.8 as a rule. The polymerization temperature is usually between approximately 60° and approximately 120° C. The polymerization takes place adiabatically or with at least partial removal of the polymerization heat by cooling, depending on the monomer-water ratio used.

After the end of polymerization, the batch is cooled and the polymer beads which have formed are separated by means of filtration or centrifugation. It is advantageous, if the beads are washed with water directly on the filter or in the centrifuge. They are subsequently dried in a suitable drier, e.g. in a drying oven or in a fluid-bed drier.

The invention is illustrated in more detail by the following examples of preferred embodiments and reference tests. All indications of percentage signify weight percents.

In order to determine the amount of emulsion polymer, the batches are filtered by suction after the end of polymerization via a 60 μm nylon gauze. Approximately 80 to 100 g of the undiluted filtrate ("mother liquor") are dried in a forced-air drying oven for 16 hours at 100° C. and thereafter for 4 hours at 125° C. The yield losses due to emulsion polymer indicated in the examples are calculated at a given monomer/water ratio from the solid content of the mother liquors determined in this manner, taking into consideration the solids added to the aqueous phase (dispersing agent, etc.).

EXAMPLE 1

A mixture of 2,800 g completely deionized water, 80 g of a 6% aqueous solution of a co-polymer consisting of 80% methacrylic acid and 20% methyl methacrylate in the form of the sodium salt with a dynamic viscosity of 1,800 mPa.s and 144 mg of the Na salt of ethylene diamine tetramethylene phosphonic acid (50 ppm in aqueous phase) were placed in a 5 liter polymerization vessel equipped with an agitator, a reflux condenser and a thermometer and heated to 50° C. 1,920 g of a mixture of 94 parts by weight methyl methacrylate, 6 parts by weight ethyl acrylate, 0.25 parts by weight n-dodecyl mercaptan and 0.4 part by weight dilauroyl peroxide were now added under agitation.

The batch was evacuated and agitated after equalization of pressure with nitrogen for three hours in a water bath of 80° C. and then cooled down to 30° C. The polymer beads were filtered off by suction at this temperature via a 60 μm nylon gauze, washed with completely deionized water and dried in a forced-air drying oven.

Clear polymer beads with an average grain diameter d of 0.30 mm (50% screen oversize) were obtained. The mother liquor contained 0.5% of a very fine polymer with an average particle size of 0.25 μm. A yield loss due to this "emulsion polymer" is calculated from this data of 0.75%. The yellowness index, measured according to ASTM D 1925 on injection-molded platelets 3 mm thick, was 0.77. The product was able to be processed after granulation in an injection molding test up to a temperature of 320° C. without decomposition bubbles.

EXAMPLE 2

Example 1 was repeated with the single difference that only 10 ppm of the sodium salt of ethylene diamine tetramethylene phosphonic acid were added to the aqueous phase. Clear polymer beads with an average grain diameter d of 0.28 mm were obtained. The yield loss due to emulsion polymer was 0.8%.

EXAMPLE 3

Example 1 was repeated with the single difference that 1,000 ppm of the sodium salt of ethylene diamine tetramethylene phosphonic acid were added to the aqueous phase. Clear polymer beads with an average grain diameter d of 0.4 mm were obtained. The yield loss due to emulsion polymer was likewise 0.8%.

EXAMPLE 4

Example 1 was repeated with the single difference that instead of the sodium salt of ethylene diamine tetramethylene phosphonic acid, 50 ppm nitrilotrimethylene phosphonic acid were added to the aqueous phase.

Clear polymer beads with an average grain diameter d of 0.35 mm were obtained. The yield loss due to emulsion polymer was 0.9%.

EXAMPLE 5

Example 1 was repeated with the single difference that instead of an addition of the sodium salt of ethylene diamine tetramethylene phosphonic acid, 50 ppm 1-hydroxyethane-1,1-diphosphonic acid were added to the aqueous phase.

Clear polymer beads with an average grain diameter d of 0.4 mm were obtained. The yield loss due to emulsion polymer was 0.9%.

EXAMPLE 6

Example 1 was repeated with the single difference that instead of the sodium salt of ethylene diamine tetramethylene phosphonic acid, 50 ppm Graham's salt were added to the aqueous phase.

Clear polymer beads with an average grain diameter d of 0.35 mm were obtained. The yield loss due to emulsion polymer was 1.2%.

REFERENCE EXAMPLE 1 A

Example 1 was repeated with the single difference that neither a polymeric, inorganic phosphate nor a polyvalent phosphonic acid was added as free acid or alkali metal salt or ammonium salt.

Clear polymer beads with an average grain diameter d of 0.28 mm were obtained. The mother liquor contained 2.4% of a very fine polymer (particle size 0.02 to 0.2 μm). This corresponds to a yield loss due to this "emulsion polymer" of approximately 3.6%.

The yellowness index according to ASTM D 1925 on injection-molded platelets 3 mm thick was 0.93, correspondingly, the improvement of the yellowness index of example 1 has the factor 0.77:0.93=0.83 (0.77 is the yellowness index of example 1); the corresponding granulate exhibited decomposition bubbles in an injection molding test at a temperature of 320° C.

REFERENCE TEST 1 B

Example 1 was repeated with the single difference that in accordance with the teaching of JP-OS 2302/83, 2.88 g (1,000 ppm) sodium citrate were added to the aqueous phase before the addition of the monomer mixture.

The yield loss due to "emulsion polymer" in the mother liquor was 2.2% in this test.

EXAMPLE 7

A mixture of 2,800 g completely deionized water, 80 g of a 6% aqueous solution of a co-polymer consisting of 70% methacrylic acid and 30% methyl methacrylate in the form of the ammonium salt with a dynamic viscosity of 1,500 mPa.s and 144 mg of the Na salt of ethylene diamine tetramethylene phosphonic acid (50 ppm in aqueous phase) were placed in a 5 liter polymerization vessel equipped with an agitator, a reflux condenser and a thermometer and heated to 50° C. 1,920 g of a mixture of 66 parts by weight styrene, 34 parts by weight n-butyl methacrylate, 0.6 parts by weight dimeric α-methyl styrene, 1.2 parts by weight dibenzoyl peroxide (as 75% aqueous powder) and 0.3 parts by weight tert. butyl perbenzoate were now added.

The batch was evacuated, agitated after equalization of pressure with nitrogen for 4 hours in a water bath of 90° C. and then cooled to 30° C. The polymer beads were filtered off by suction at this temperature via a 60 μm nylon gauze, washed with completely deionized water and dried in a fluidbed drier at 60° C.

Clear polymer beads with an average grain diameter of 0.8 mm were obtained.

The "emulsion polymer" portion of the mother liquor was 1.1%; this corresponds to a yield loss of 1.4%.

REFERENCE TEST 2

Example 7 was repeated with the single difference that the Na salt of ethylene diamine tetramethylene phosphonic acid was not added.

Clear polymer beads with an average grain diameter of 0.7 mm were obtained. The "emulsion polymer" portion of the mother liquor was 2.2%; this corresponds to a yield loss of 2.8%.

EXAMPLE 8

2,880 g completely deionized water in which 6.6 g of a partially saponified polyvinyl acetate with an ester number of 140 mg KOH/g and an average molecular weight of 127,000 g/mole—obtainable e.g. under the commercial designation Mowiol 40/88—were dissolved together with 144 mg of the sodium salt of ethylene diamine tetramethylene phosphonic acid were placed in a 5 liter polymerization vessel equipped with an agitator, a reflux condenser and a thermometer and heated to 60° C.; 1,920 g of a mixture of 98 parts by weight methyl methacrylate, 2 parts by weight n-butyl acrylate, 0.2 part by weight n-dodecyl mercaptan and 0.5 part by weight dilauroyl peroxide were added with agitation. The batch was evacuated and agitated after equalization of pressure with nitrogen for 3 hours in a water bath of 80° C. and then cooled down to 30° C. The polymer beads were filtered off by suction at this temperature via a 60 μm nylon gauze, washed with completely deioniuzed water and dried at 60° C. in a fluid-bed drier.

Clear polymer beads with an average grain diameter d of 0.28 mm were obtained. The "emulsion polymer" portion of the mother liquor was 1.25%; this corresponds to a yield loss of 1.85%.

REFERENCE TEST 3

Example 8 was repeated but without the addition of the sodium salt of ethylene diamine tetramethylene phosphonic acid.

Clear polymer beads with an average grain diameter d of 0.28 mm were likewise obtained. However, the "emulsion polymer" portion of the mother liquor was 2.6%; this corresponds to a yield loss of 3.9%.

EXAMPLE 9

A mixture of 2,820 g completely deionized water, 60 g of a 6% aqueous solution of a co-polymer consisting of 60% methacrylic acid and 40% methyl methacrylate in the form of the potassium salt with a dynamic viscosity of 1,400 mPa.s, 0.5 g sodium sulfate, 1 g magnesium sulfate and 144 mg of the potassium salt of ethylene diamine tetramethylene phosphonic acid were placed in a 5 liter polymerization vessel equipped with an agitator, a reflux condenser and a thermometer and heated to 40° C. 1,920 g of a mixture of 20 parts by weight methyl methacrylate, 80 parts by weight n-butyl methacrylate, 0.3 part by weight n-dodecyl mercaptan and 0.5 part by weight dilauroyl peroxide were now added with agitation. The batch was evacuated and agitated after equalization of pressure with nitrogen for 3.5 hours in a water bath at 75° C. and then cooled to 30° C. The polymer beads were filtered off by suction at this temperature via a 60 μm nylon gauze, washed with completely deionized water and dried at 40° C. in a fluid-bed drier.

Clear polymer beads with an average particle diameter d of 0.25 mm were obtained. The "emulsion polymer" portion of the mother liquor was 0.25%; this corresponds to a yield loss of 0.4%.

REFERENCE TEST 4 A

Example 9 was repeated but without the addition of the sodium salt of ethylene diamine tetramethylene phosphonic acid.

Clear polymer beads with an average grain diameter d of 0.25 mm were likewise obtained. The "emulsion polymer" portion of the mother liquor was 1.6%; this corresponds to a yield loss of 2.4%.

REFERENCE TEST 4 B

Example 9 was repeated with the single difference that 288 mg (100 ppm) of the sodium salt of ethylene diamine tetraacetic acid were added to the aqueous phase in accordance with the teaching of JP-OS 2302/83 instead of the sodium salt of ethylene diamine tetramethylene phosphonic acid. The "emulsion polymer" portion of the mother liquor was 1.4%; this corresponds to a yield loss of 2.1%.

EXAMPLE 10

A mixture of 2,310 g completely deionized water, 576 g of a 1% aqueous solution of a hydrophobically modified hydroxyethyl cellulose with a molar degree of substitution of 3.3 and a solution viscosity (1% aqueous solution) of approximately 300 mPa.2—obtainable e.g. under the commercial designation Natrosol Plus Grade 330 (Aqualon Company) and 144 mg of the Na salt of ethylene diamine tetramethylene phosphonic acid were placed in a 5 liter polymerization container equipped with an agitator, a reflux condenser and a thermometer and heated to 50° C. 1,920 g of a mixture of 99 parts by weight methyl methacrylate, 1 part by weight n-butyl acrylate, 0.4 part by weight n-dodecyl mercaptan and 0.25 part by weight dilauroyl peroxide were now added under agitation.

The batch was evacuated and agitated after equalization of pressure with nitrogen for 3.5 hours in a water bath at 75° C. and then cooled down to 30° C. The polymer beads were filtered off by suction at this temperature via a 60 μm nylon gauze, washed with completely deionized water and dried at 40° C. in a fluid-bed drier.

Clear polymer beads with an average grain diameter d of 0.35 mm were obtained. The "emulsion polymer" portion of the mother liquor was 1.4%; this corresponds to a yield loss of approximately 2.1%.

REFERENCE TEST 5

Example 10 was repeated but without the addition of the sodium salt of ethylene diamine tetramethylene phosphonic acid.

Clear polymer beads with an average grain diameter d of 0.3 mm were obtained. The "emulsion polymer" portion of the mother liquor was 3.8%; this corresponds to a yield loss of 5.5%.

What is claimed is:

1. In a method of producing suspension polymers by polymerization of a monomeric material selected from the group consisting of esters of acrylic acid and methacrylic acid, vinyl aromatics and monomer mixtures consisting primarily of such monomers in aqueous suspension and in the presence of a water-soluble, high-molecular organic dispersing agent;

the improvement in which there is also present during the polymerization at least one additive selected from the group consisting of (a) polyvalent phosphonic acids having 2 to 10 phosphonic acid groups in the molecule in the form of its free acid or in the form of its alkali metal salt or ammonium salt and (b) alkali metal salts and ammonium salts of a condensed inorganic phosphate having the formula $M^1_{n+2}P_nO_{3n+1}$ in which $M^1$ signifies an alkali metal ion or an ammonium ion and n signifies a number from 3 to 100.

2. A method according to claim 1 in which said additive is used in an amount of 2 to 5,000 ppm relative to the water present during the polymerization.

3. A method according to claim 1 in which said additive is used in an amount of 5 to 500 ppm relative to the water present during the polymerization.

4. A method according to claim 1 in which said additive is used in an amount of 10 to 100 ppm relative to the water present during the polymerization.

5. A method as set forth in claim 1 in which said monomeric material contains up to 10% by weight of another monomer.

6. A method as set forth in claim 5 in which said other monomer is an $\alpha,\beta$, unsaturated mono- or di-carboxylic acid.

7. A method according to claim 1 in which said polyvalent phosphonic acids having 2 to 5 phosphonic acid groups in the molecule in the form of its free acid or in the form of its alkali metal salt or ammonium salt.

* * * * *